(12) United States Patent
Varkey et al.

(10) Patent No.: US 7,714,231 B2
(45) Date of Patent: May 11, 2010

(54) MOTOR WINDING WIRE FOR A HYDROCARBON APPLICATION

(75) Inventors: Joseph Varkey, Sugar Land, TX (US); Byong Jun Kim, Sugar Land, TX (US); Pete Howard, Bellville, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/951,818

(22) Filed: Dec. 6, 2007

(65) Prior Publication Data

US 2008/0191575 A1 Aug. 14, 2008

Related U.S. Application Data

(60) Provisional application No. 60/889,650, filed on Feb. 13, 2007.

(51) Int. Cl.
*H01B 7/00* (2006.01)

(52) U.S. Cl. .................................................. 174/120 R

(58) Field of Classification Search ............ 174/120 R, 174/120 SR, 110 R, 110 F; 310/194
See application file for complete search history.

(56) References Cited

U.S. PATENT DOCUMENTS

| 4,851,060 | A | 7/1989 | Wade, Jr. et al. |
| 5,371,325 | A | 12/1994 | Kalola et al. |
| 6,359,230 | B1* | 3/2002 | Hildreth ................. 174/110 R |
| 6,600,108 | B1* | 7/2003 | Mydur et al. ........... 174/120 R |
| 2004/0045735 | A1* | 3/2004 | Varkey et al. ........... 174/120 R |
| 2005/0045343 | A1* | 3/2005 | Bixenman et al. ........... 166/385 |
| 2006/0137895 | A1* | 6/2006 | Varkey et al. ........... 174/113 R |

FOREIGN PATENT DOCUMENTS

GB 797261 A 6/1958

\* cited by examiner

*Primary Examiner*—Chau N Nguyen
(74) *Attorney, Agent, or Firm*—Kevin B. McGoff; Rodney Warfford

(57) ABSTRACT

A motor winding wire. The motor winding wire may be configured for use in, and direct exposure to, a hydrocarbon environment. The motor winding wire may be electrically insulated by one polymer layer, whereas another, outer, polymer layer is employed to provide moisture resistance as well as other contaminant and hydrocarbon environment shielding to the underlying layer. Additionally, this manner of polymer layering over the motor winding wire is achieved in a manner cognizant of the limited dimension of the motor winding wire.

27 Claims, 4 Drawing Sheets

MOTOR WINDING WIRE FOR A HYDROCARBON APPLICATION

CROSS REFERENCE TO RELATED APPLICATION(S)

This Patent Document claims priority under 35 U.S.C. §119(e) to U.S. Provisional Application Ser. No. 60/889,650, entitled Motor Winding Wires for Oilfield Application, filed on Feb. 13, 2007, which is incorporated herein by reference.

FIELD

Embodiments described relate to equipment for placement within a hydrocarbon well. In particular, embodiments of equipment employing magnetized motor winding wires are described wherein the equipment may be configured for placement and relatively continuous use within the well over an extended period of time, perhaps between about 1½ and 5 years.

BACKGROUND

A variety of hydrocarbon applications involve the use of electrically powered equipment disposed within a hydrocarbon well for extended periods of time. For example, an electric submersible pump (ESP) may be positioned within a hydrocarbon well to promote the extraction of hydrocarbons from the well. In such circumstances it may be preferable to leave the pump in place and operating throughout the hydrocarbon production from the well. Thus, depending on the hydrocarbon reservoir itself and the parameters of the operation, the pump may be left operating and in place for up to about 5 years or longer.

Equipment such as the indicated ESP may include several components susceptible to damage upon exposure to the downhole conditions of the well. For example, the moisture content, chemical makeup, and pressure or temperature extremes of the downhole environment may tend to degrade certain components of the ESP over time. Components of the ESP susceptible to such exposure may include a power cable and motor parts such as motor windings or conductors. However, measures may be taken to help shield such components from the downhole environment. For example, in the case of the power cable, thick and robust, moisture resistant polymer layers may be extruded over an electrically conductive core. In this manner the core may remain substantially unaffected by downhole conditions so as to help ensure that the cable remains operation for an extended period. Alternatively, in the case of the motor and windings, they may be housed within an oil-filled and hermetically sealed casing isolated from the environment of the well.

Unfortunately, the oil filled casing noted above invariably fails to maintain complete isolation from the conditions in the surrounding downhole environment. For example, when left within the well for an extended period, moisture and chemical contaminants from the downhole environment are eventually able to seep through and penetrate the casing to some degree. Nevertheless, in the case of some parts of the motor, the fact that the casing remains predominantly oil-filled may be enough to avoid failure. For example, the moving parts of the motor may remain in the presence of sufficient lubrication to remain operational in spite of a degree of moisture and chemical contaminants. However, as described below, the direct exposure of the motor windings to the well contaminants, especially moisture, may be enough to render them ineffective, leading to malfunction of the entire ESP.

Unlike other parts of the motor, motor winding wires are not dependent upon the presence of sufficient oil concentration within the casing in order to remain operational. Rather, like the power cable, it is the substantial shielding of the motor winding wires from direct contact with downhole contaminants, especially moisture, which may be key to ensuring continued functionality of the wires. However, as indicated above, given enough time downhole, the casing is likely to be penetrated by such downhole contaminants leaving the wires directly exposed to contaminants.

In order to further shield the motor winding wires from direct exposure to downhole contaminants, polymer layers may be provided about the conductive core of the motor winding wires. Thus, in theory, the polymer layers may provide a degree of shielding to the motor winding wires similar to the power cable configuration noted above. Unfortunately, however, the dimensions and properties of the motor winding wires themselves render conventional polymer layering and shielding ineffective for prolonged protection of the wires from exposure to downhole contaminants. For example, a conventional motor winding wire may be magnetized wire core of no more than about 5 gauge copper wire, generally between about 16 and 50 gauge. Furthermore, the motor winding wire may be configured for relatively tight windings. As such, no more than between about 0.25 to 20 mil polymer layers may be effectively provided over the wires. In fact, for 30 gauge or so windings and smaller, as a matter of practicality it may be more effective to bypass extruding the polymer layer altogether and simply varnish the polymer over the wound wires to provide the shielding from downhole contaminants. Regardless, the polymer layer may be of limited thickness and effectiveness.

In addition to the limited thickness, the effectiveness of the polymer layer as a shield from downhole contaminants may be further limited by the particular types of polymers available for use with motor winding wires. That is, given the small dimension and the conductive nature of motor winding wire, materials disposed thereabout may be of an electrically insulating character to ensure proper wire operation. These materials may include polyimide, polyester, polyamide, polyether-ether-ketone and other conventional electrical insulators. Unfortunately, however, such insulators are prone to hydrolytic degradation or moisture absorption upon prolonged direct exposure to even a small degree of moisture and other downhole contaminants. As a result, the motor winding wire as well as the entire ESP or other equipment employing such winding wire is prone to fail, generally well in advance of about 5 years. In fact, smaller ESP motors positioned downhole for continued use often display a lifespan of no more than about 1 year. Furthermore, efforts to overcome polymer shielding limitations via over-wrapping or enamel layer configurations remain insufficient to prevent such hydrolytic degradation and moisture absorption.

SUMMARY

A motor winding wire is provided for an application in a hydrocarbon environment such as the downhole environment of a well. The wire includes a conductive core with an electrically insulating polymer layer thereabout. A moisture resistant outer polymer layer is provided about the electrically insulating polymer layer for shielding it from moisture in the environment.

In one embodiment, a tie layer may be disposed between the electrically insulating polymer layer and the moisture resistant outer polymer layer. The tie layer may include a polymer of one of the outer polymer layer and the electrically insulating polymer layer along with an adhesive functional group to provide bonding between the outer and electrically insulating polymer layers.

DETAILED DESCRIPTION

Embodiments are described with reference to certain types of motor winding wires for use with electrical equipment for hydrocarbon applications. In particular, focus is drawn to equipment in the form of electric submersible pumps employed within hydrocarbon wells. However, a variety of electrical equipment may employ embodiments described herein, particularly where the equipment is intended for long term and/or continuous use while exposed to a harsh or moisture rich hydrocarbon environment.

Figure 1:
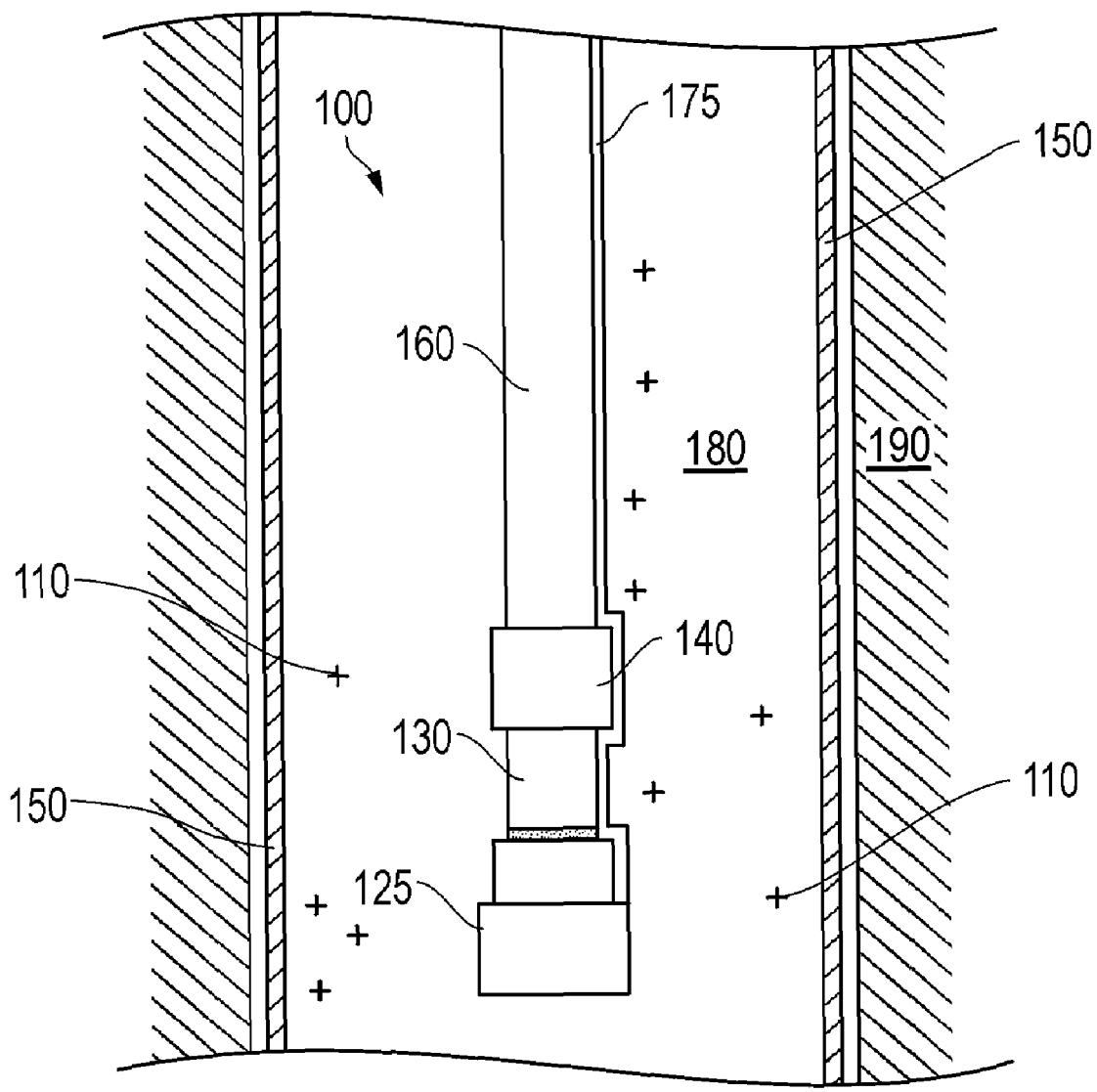
FIG. 1 is a side cross-sectional view of a well with an embodiment of an electrically driven assembly disposed therein.
Figure 2:
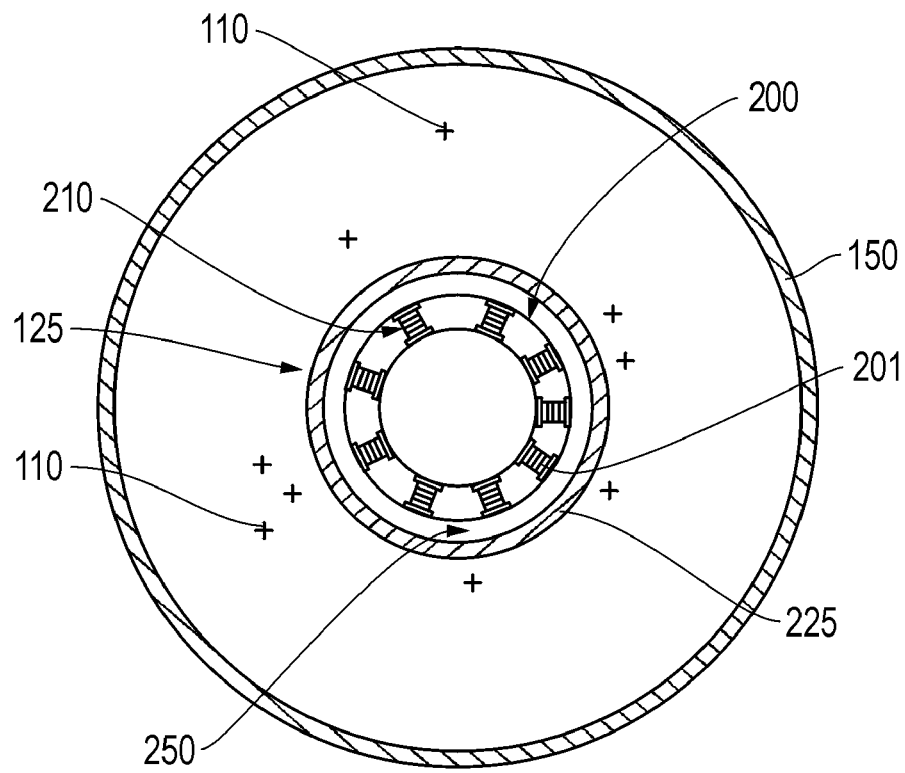
FIG. 2 is an enlarged cross-sectional view of an electric motor of the assembly and the well of FIG. 1.

Referring now to FIGS. 1 and 2, an embodiment of an electrically driven assembly 100 is depicted disposed within a hydrocarbon well 180. The well 180 is defined by a casing 150 through a formation 190 at an oilfield. In the embodiment shown, the assembly 100 is electronically driven equipment in the form of an electric submersible pump (ESP). However, other types of electrically driven equipment may be employed within such a well 180. As shown, the ESP assembly 100 includes an extraction line 160, a pump 140, and an intake region 130, as well as a motor 125 powered by a cable 175. The ESP assembly 100 may operate by rotation of a motor assembly 200 within a casing 225 of the motor 125. The motor 125 may be employed to power the pump 140 to draw in hydrocarbon fluids from the environment of the well 180. Such fluids may then be driven up the extraction line 160 to the well surface.

The above-noted assembly 100 may be disposed within the well 180 for continuous operation over an extended period of time. For example, an ESP assembly 100 may be disposed within the well 180 as shown for substantially continuous use throughout the productive life of the well 180. In most cases, this may be between about 2 and 5 years, or longer. For this period, the assembly 100 may be subjected to harsh well conditions such as extreme temperatures or pressures, and exposed to contaminants 110 such as moisture and corrosive chemicals. Nevertheless, the assembly 100 may remain functional throughout the substantial duration of the productive life of the well 180. In particular, as detailed below, motor winding spools 210 of the assembly 100 may be sufficiently shielded from contaminants 110 of the well 180 so as to avoid operational failure of the assembly 100 during the productive life of the well 180.

Continuing with reference to FIGS. 1 and 2, the assembly 100 is directly exposed to the environment of the well 180 which includes the above-noted contaminants 110. With reference to FIG. 2, a casing 225 of the motor 125 may be hermetically sealed to provide a degree of protection from the indicated contaminants 110. Nevertheless, at some point during the life of the well 180, contaminants 110 may reach an oil-filled space 250 within the casing 225. Thus, the rotatable motor assembly 200 being located within the oil-filled space 250 may be directly exposed to such contaminants 110. Of particular note, motor winding wire 201 of motor winding spools 210 may come into direct contact with contaminants 110 such as moisture. However, as detailed below, the electrical conductivity of the motor winding wire 201 may remain substantially unaffected by contact with moisture contaminants 110. Thus, failure of the motor 125 and thus, the entire ESP assembly 100 may be avoided. Furthermore, while the spools 210 are shown disposed within an ESP assembly 100, other motorized assemblies may employ motor winding wire 201 as noted below. Such assemblies may include downhole tractor assemblies, powered centralizers, perforation guns, sampling tools and a host of other assemblies that may be motorized.

Figure 3:
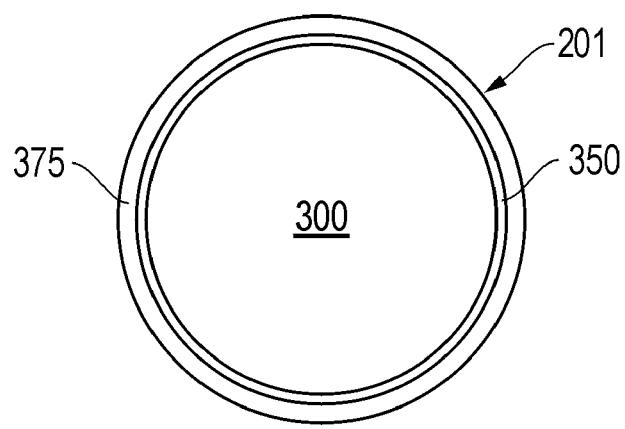
FIG. 3 is an enlarged cross-sectional view of an embodiment of a motor winding wire of the electric motor of FIG. 2.

Referring now to FIG. 3, with added reference to FIG. 2, embodiments of motor winding wire 201 may be configured and constructed so as to avoid contaminant 110 contact with a conductive core 300 of the wire 201. In this manner, the conductive nature of the core 300, generally magnetized copper, may remain unaffected by contaminants 110 otherwise prone to diminish conductivity. In particular, the conductive core 300 may be shielded by a tailored combination of polymer layers 350, 375 as described below.

In order to provide corona discharge resistance and electrically isolate the conductive core 300, an insulating polymer layer 350 may be provided thereabout. The insulating polymer layer 350 may be of a variety of polymer types conventionally used for electrically insulating winding or magnet wires and provided in a variety of manners. For example, where the motor winding wire 201 is larger than about 18 gauge, the insulating polymer may be extruded to more than about 2 mils in thickness over the core 300 to form the layer 350. Alternatively, for smaller winding wire 201, an enamel coating or varnishing process may be employed to provide less than about 2 mils of insulating polymer over the core 300, thereby forming the insulating polymer layer 350. Additionally, other techniques for providing the layer 350 may be employed such as use of an adhesive tape form of the insulating polymer, with the adhesive type selected based on downhole temperature extremes likely to be encountered within the well 180.

Materials for the insulating polymer layer 350 when provided by extrusion or in the form of a polymer tape may include a polyimide, polyester, polyesterimide, polyamide-imide, polyamide, poly-ether-ether-ketone, polyethylene terephthalate, polyphenylene sulfide, and a self-reinforced polyphenylene. Alternatively, where the above described technique of varnishing is employed, the insulating polymer layer 350 may more preferably be a polymeric imide, ester, ester-imide, ester-amide, amide-imide, urethane or an epoxy. Additionally, the polymeric or epoxy material may be filled with nano-scale particles configured to improve durability and/or insulating characteristics of the insulating polymer layer 350.

Continuing with reference to FIG. 3, with added reference to FIGS. 1 and 2, the insulating polymer layer 350 may provide sufficient electrical insulation and corona discharge protection. However, an additional moisture resistant outer polymer layer 375 may be provided over the insulating polymer layer 350 so as to prevent contaminants 110 such as moisture from reaching the insulating polymer layer 350. In this manner, an insulating polymer may be selected for the underlying insulating polymer layer 350 without significant concern over contaminants 110 within the well 180. In particular, the material for the insulating polymer layer 350 may be selected without significant concern over hydrolytic degradation thereof. That is, the outer polymer layer 375 may be configured to shield the insulating polymer layer 350 from moisture within the well 180. Thus, electrically insulating polymers, perhaps even those otherwise susceptible to hydrolytic degradation upon exposure to moisture, may nevertheless be employed in forming the insulating polymer layer 350. As a result, a greater degree of flexibility may be exercised in selecting the proper insulating polymer for electrical isolation of the underlying core 300.

In addition to shielding the underlying insulating polymer layer 350, the outer polymer layer 375 may be configured without significant regard to providing electrical insulation to the core 300. Thus, polymers for the outer polymer layer 375 may be selected with focus on moisture resistance, corrosive chemical resistance or other contaminant shielding characteristics.

In one embodiment, the outer polymer layer 375 may be particularly configured based on downhole temperatures within a well 180 such as that of FIGS. 1 and 2. For example, the outer polymer layer 375 may be configured to withstand high-temperature downhole conditions exceeding about 300° C. In such an embodiment, the outer polymer layer 375 may be configured of a fluoropolymer. For example, an ethylene-tetrafluoroethylene copolymer may be employed, perhaps amended with an adhesive functional group to promote adhesion to the insulating polymer layer 350 may be employed. Maleic anhydride, acrylic acid, carboxyl acid, or silane, may serve as such an adhesive group. Other suitable high temperature resistant materials for the outer polymer layer 375 may include polychlorotrifluoroethylene or ethylene chlorotrifluoroethlyene which may similarly be amended with an adhesive group as described. Additionally, perfluoroalkoxy resin, fluorinated ethylene propylene copolymer, polytetrafluoroethylene, expanded-polytetrafluoroethylene (ePTFE), and any improved fluoropolymers may be employed to form the outer polymer layer 375.

In another embodiment, the outer polymer layer 375 may be configured for lower temperature applications at below about 300° C. and of a polyolefin such as polyethylene, polypropylene, ethylene-propylene copolymer, poly(4-methyl-1-pentene), and a polyolefin elastomer. Again, these materials may be amended with maleic anhydride, acrylic acid, carboxyl acid, silane or other suitable material to promote adhesion to the underlying electrically insulating polymer layer 350.

As with the insulating polymer layer 350, a variety of techniques may also be employed to deliver the outer polymer layer 375. That is, depending on wire sizing, the outer polymer layer 375 may be extruded, perhaps even co-extruded with the insulating polymer layer 350. In one embodiment the outer polymer layer 375 is processed down to about 1 mil following the extrusion. Alternatively, the outer polymer layer 375 may be sintered over the insulating polymer layer 350 by conventional techniques. Additionally, an adhesive tape form of the outer polymer may be employed to provide the outer polymer layer 375 over the insulating polymer layer 350.

Figure 4:
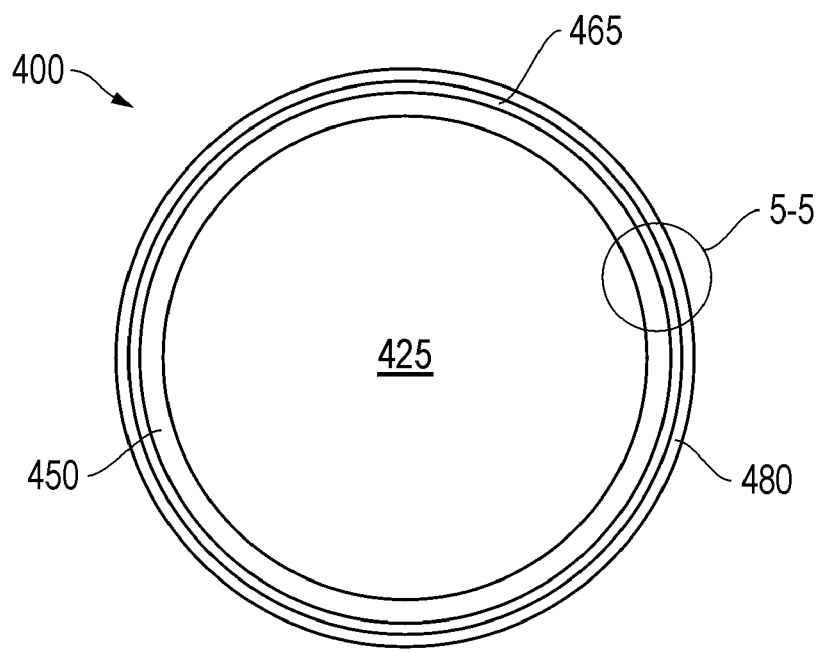
FIG. 4 is cross-sectional view of an alternate embodiment of a motor winding wire.

Referring now to FIG. 4, an alternate embodiment of a motor winding wire 400 is depicted. Of particular note is the fact that the wire 400 includes an additional tie layer 465 disposed between its outer polymer layer 480 and its insulating polymer layer 450. The tie layer 465 may be employed to serve as an adhesive layer between the outer polymer layer 480 and underlying insulating polymer layer 450 so as to ensure adequate bonding therebetween. As detailed below, the tie layer 465 may be particularly advantageous in maintaining such a bond given the different types of materials employed for the outer polymer layer 480 versus the underlying insulating polymer layer 450. Ensuring adequate bonding in this manner may be beneficial to the performance and life of an electric motor 125 in a harsh downhole environment such as that of FIG. 1.

Continuing with reference to FIG. 4, the insulating polymer layer 450 may be configured for electrically insulating a conductive core 425 of the wire 400. Thus, the insulating polymer layer 450 may be made of materials such as those detailed above for the insulating polymer layer 350 of the motor wire 201 of FIGS. 2 and 3. Additionally, the outer polymer layer 480 may be configured to provide contaminant resistance to the underlying portions of the wire 400, for example, to moisture. Thus, again, the materials employed for the outer polymer layer 480 may be those detailed above with reference to the outer polymer layer 375 of the wire 201 of FIGS. 2 and 3. However, given the generally different purposes of the insulating polymer layer 450 as compared to the outer polymer layer 480, the tie layer 465 may be provided to ensure adequate bonding of the layers 450, 465, 480 to one another.

Figure 5:
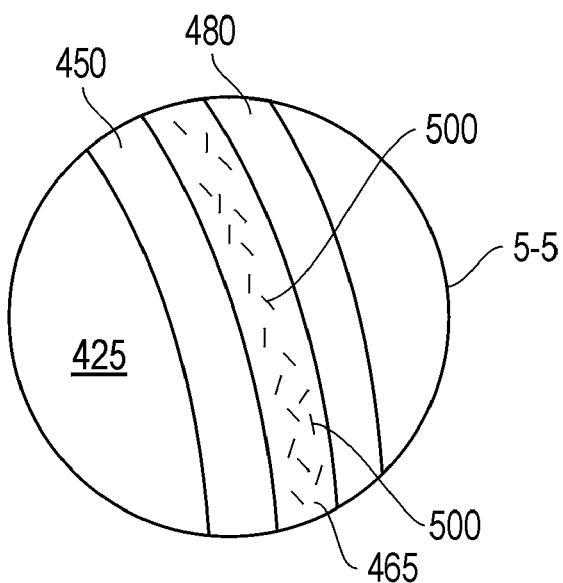
FIG. 5 is an enlarged view of the motor winding wire of FIG. 4 taken from 5-5.

Continuing with reference to FIG. 5, an enlarged view of section 5-5 of FIG. 4 is depicted. In particular, the tie layer 465 is shown between the outer polymer layer 480 and the insulating polymer layer 450 as described above. So as to ensure compatibility and bonding to both the other layers 450, 480, the tie layer 465 is made up of a main chain or base polymer of one of the adjacent layers 450, 480 with a functional group 500 disbursed therein having an adhesive character relative to the other of the layers 450, 480. In this manner, the base polymer of the tie layer 465 may provide for adhesion of one adjacent layer 450, 480 to the tie layer 465 while the functional group 500 provides adhesion to the other.

A variety of base polymers may be employed for the tie layer 465 depending on the materials of the adjacent insulating polymer layer 450 and outer polymer layer 480. For example, polyethylene, polypropylene, ethylene-propylene copolymer, poly(4-methyl-1-pentene), ethylene-tetrafluoroethylene copolymer, ethylene fluorinated ethylene-propylene terpolymers, polychlorotrifluoroethylene, ethylene chlorotrifluoroethlyene, as well as a host of other fluoropolymers may be employed as the base polymer of the tie layer 465. Maleic anhydride, acrylic acid, carboxyl acid, silane or other suitable functional group 500 may similarly be employed to serve as an adhesive relative to one of the layers 450, 480 adjacent the tie layer 465.

By way of example, with reference to the above listed material choices for the tie layer 465, one embodiment of a motor winding wire 400 as depicted in FIG. 4 may include an electrically insulating polymer layer 450 of polyamide material whereas the contaminant resistant outer polymer layer 480 may be of ethylene-tetrafluoroethylene copolymer. In such an embodiment, the tie layer 465 may be made up of ethylene-tetrafluoroethylene copolymer as its base polymer for adhesion to the outer polymer layer 480. In this example a functional group 500 of, for example, maleic anhydride may be present throughout the tie layer 565 as depicted in FIG. 5 to provide adhesion to the underlying insulating polymer layer 450.

Continuing with reference to FIGS. 4 and 5, manufacture of the depicted motor winding wire 400 may be according to techniques described above relative to the insulating polymer layer 450 and the outer polymer layer 480. Providing of the intervening tie layer 465 is preferably achieved by extrusion. In fact, in one embodiment each of the layers 450, 465, 480 is simultaneously co-extruded about the conductive core 425 to form the wire 400.

Figure 6:
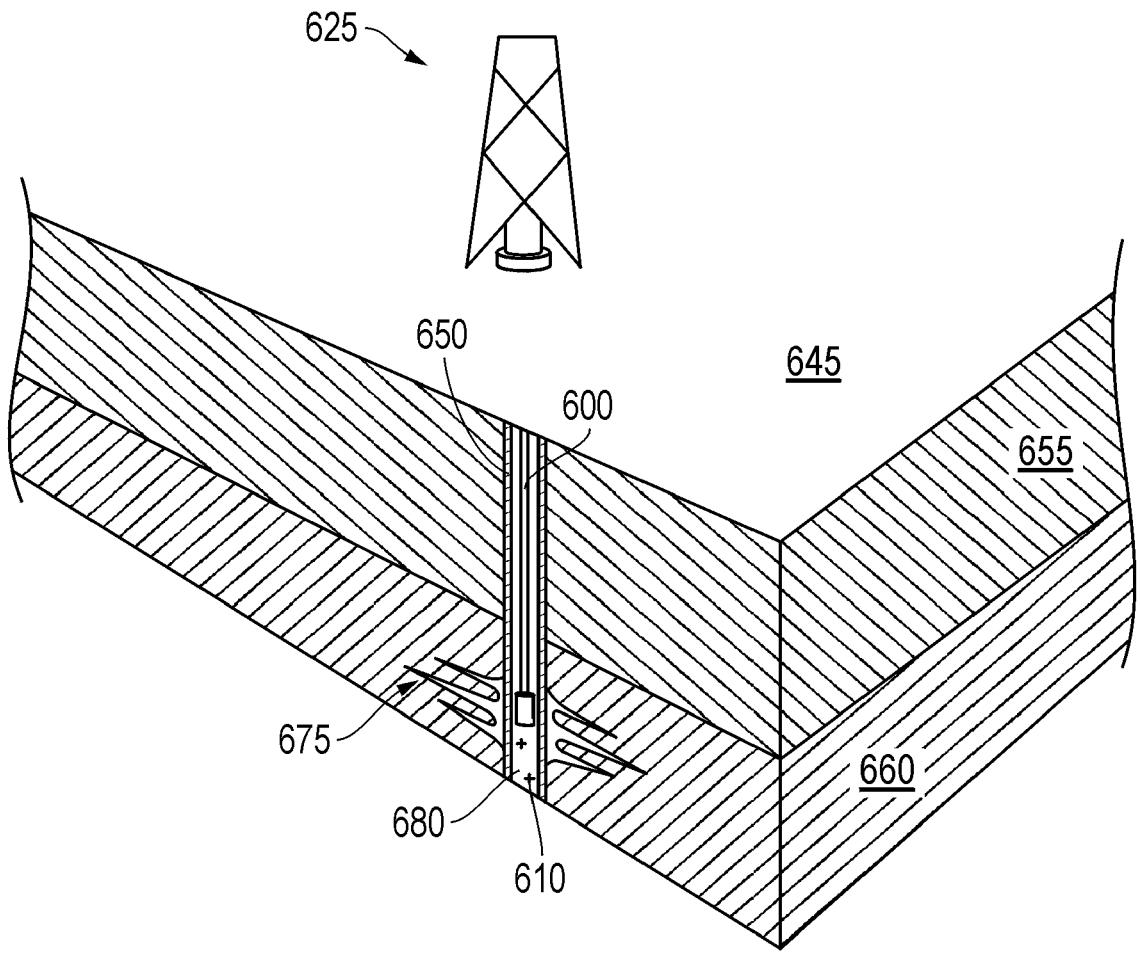
FIG. 6 is a partially cross-sectional overview of an embodiment of an electrically driven assembly within a well at an oilfield.

Referring now to FIG. 6, an embodiment of a contaminant resistant electrically driven assembly 600 in the form of an ESP is depicted within a well 680 at an oilfield 645. The well 680 is positioned below conventional surface equipment 625 at the oilfield 645 and equipped with a casing 650 traversing various portions 655, 660 of a formation. The well 680 ultimately provides access to a production region 675 where the ESP assembly 600 may be positioned for long term operation exceeding about 2 years and perhaps throughout the productive life of the well 680.

Resistance to moisture, harsh chemicals, and other potential contaminants 610 is provided to motor winding wires of the ESP assembly 600 according to configurations and techniques detailed above. Thus, in spite of the potentially harsh moisture rich downhole conditions, embodiments of the ESP assembly 600 may be left in place without undue concern over the possibility of pump failure. In this manner, expenses associated with well shut down and pump replacement may generally be avoided.

Embodiments described hereinabove include motor winding wires, which, in spite of limited dimension, may be provided with adequate electrical insulating along with sufficient polymer shielding so as to allow for their direct exposure to moisture and other hydrocarbon contaminants without undue risk of premature failure. In fact, equipment employing such motor winding wires may be positioned downhole in a hydrocarbon well and operated continuously for the substantial life of the well without serious concern over equipment breakdown due to motor winding wire failure.

The preceding description has been presented with reference to presently preferred embodiments. However, other embodiments not detailed hereinabove may be employed. For example, a motor winding wire constructed of materials and according to techniques detailed hereinabove may be employed in conjunction with powering of a downhole tractor, powered centralizer, perforation gun, sampling or other oilfield tools aside from an ESP. Persons skilled in the art and technology to which these embodiments pertain will appreciate that still other alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. A motor for use within a hydrocarbon wellbore, the motor comprising:
   a hermetically sealed casing containing an oil-filled space;
   at least one spool of motor winding wire disposed within the oil-filled space of the casing and comprising:
      a conductive core;
      an electrically insulating polymer layer about said conductive core; and
      a contaminant resistant outer polymer layer about said electrically insulating polymer layer.

2. The motor of claim 1 wherein the hydrocarbon application is a downhole well application and said outer polymer layer is contaminant resistant to one of moisture and a corrosive chemical in the wellbore.

3. The motor of claim 1 wherein said insulating polymer layer is of a material selected from a group consisting of a polyimide, polyester, polyesterimide, polyamide-imide, polyamide, poly-ether-ether-ketone, polyethylene terephthalate, polyphenylene sulfide, a self-reinforced polyphenylene, polymeric imide, polymeric ester, polymeric ester-imide, polymeric ester-amide, polymeric amide-imide, polymeric urethane, and an epoxy.

4. The motor of claim 1 wherein said outer polymer layer is of a material selected from a group consisting of an ethylene-tetrafluoroethylene copolymer, polychlorotrifluoroethylene, ethylene chlorotrifluoroethlyene, perfluoroalkoxy resin, fluorinated ethylene propylene copolymer, polytetrafluoroethylene, expanded-polytetrafluoroethylene (ePTFE), any improved fluoropolymers, polyethylene, polypropylene, ethylene-propylene copolymer, poly(4-methyl-1-pentene), and a polyolefin elastomer.

5. The motor of claim 1 wherein the hydrocarbon application is a downhole well application at a temperature exceeding about 300° C. and said outer polymer layer is of a fluoropolymer configured to withstand the temperature exceeding about 300° C.

6. The motor of claim 1 wherein the hydrocarbon application is a downhole well application at a temperature less than about 300° C. and said outer polymer layer is of a polyolefin.

7. The motor of claim 1 further comprising a tie layer disposed between said electrically insulating polymer layer and said outer polymer layer, said tie layer comprising a polymer of one of said electrically insulating polymer layer and said contaminant resistant outer polymer layer and an adhesive functional group for bonding therebetween.

8. The motor of claim 1 wherein said at least one spool of motor winding wire comprises a plurality of spools of motor winding wire in the oil-filled space, wherein each of the plurality of spools of motor winding wire comprises:
   a conductive core;
   an electrically insulating polymer layer about said conductive core; and
   a contaminant resistant outer polymer layer about said electrically insulating polymer layer.

9. The motor of claim 1 wherein the electrically insulating polymer layer and the contaminant resistant outer polymer layer each extend substantially along an entire spooled length of the conductive core.

10. The motor of claim 1 wherein the motor forms a portion of an electrically submersible pump.

11. A motor for use within a hydrocarbon wellbore, the motor comprising:
   a casing;
   at least one spool of motor winding wire disposed within the casing and comprising:
      a conductive core;
      an electrically insulating polymer layer about said conductive core; and
      a contaminant resistant outer polymer layer about said electrically insulating polymer layer, wherein said outer polymer layer is of a material selected from a group consisting of an ethylene-tetrafluoroethylene copolymer, polychlorotrifluoroethylene, ethylene chlorotrifluoroethlyene, perfluoroalkoxy resin, fluorinated ethylene propylene copolymer, polytetrafluoroethylene, expanded-polytetrafluoroethylene (ePTFE), any improved fluoropolymers, polyethylene, polypropylene, ethylene-propylene copolymer, poly(4-methyl-1-pentene), and a polyolefin elastomer, and wherein said outer polymer layer is amended with an adhesive functional group to enhance bonding to said insulating polymer layer.

12. The motor of claim 11 wherein the adhesive functional group is one of maleic anhydride, acrylic acid, carboxyl acid, and silane.

13. An electrically submersible pump assembly for use in a hydrocarbon well and comprising:
a pump;
a motor configured to operate the pump;
an electrical cable external of the motor and connected to the motor to electrically power the motor,
wherein the motor comprises:
a casing;
at least one spool of motor winding wire separate from the electrical cable and disposed within the casing and comprising:
a conductive core;
an electrically insulating polymer layer about said conductive core;
a contaminant resistant outer polymer layer; and
a tie layer disposed between said insulating polymer layer and said outer polymer layer to provide bonding therebetween.

14. The electrically submersible pump assembly of claim 13 wherein said tie layer comprises a base polymer for bonding to one of said insulating polymer layer and said outer polymer layer, said base polymer selected from a group consisting of a polyimide, polyester, polyesterimide, polyamide-imide, polyamide, poly-ether-ether-ketone, polyethylene terephthalate, polyphenylene sulfide, a self-reinforced polyphenylene, polymeric imide, polymeric ester, polymeric ester-imide, polymeric ester-amide, polymeric amide-imide, polymeric urethane, an epoxy, an ethylene-tetrafluoroethylene copolymer, polychlorotrifluoroethylene, ethylene chlorotrifluoroethlyene, perfluoroalkoxy resin, fluorinated ethylene propylene copolymer, polytetrafluoroethylene, polyethylene, polypropylene, ethylene-propylene copolymer, poly(4-methyl-1-pentene), and a polyolefin elastomer.

15. The electrically submersible pump assembly of claim 14 wherein said tie layer further comprises an adhesive functional group for adhering to another of said insulating polymer layer and said outer polymer layer, said adhesive functional group selected from a group consisting of maleic anhydride, acrylic acid, carboxyl acid, and silane.

16. The electrically submersible pump assembly of claim 13, wherein the casing is hermetically sealed and has an oil-filled space, and wherein the at least one spool of motor winding is disposed in the oil-filled space.

17. The electrically submersible pump assembly of claim 13, wherein said outer polymer layer is of a material selected from a group consisting of an ethylene-tetrafluoroethylene copolymer, polychlorotrifluoroethylene, ethylene chlorotrifluoroethlyene, perfluoroalkoxy resin, fluorinated ethylene propylene copolymer, polytetrafluoroethylene, expanded-polytetrafluoroethylene (ePTFE), any improved fluoropolymers, polyethylene, polypropylene, ethylene-propylene copolymer, poly(4-methyl-1-pentene), and a polyolefin elastomer, and
wherein said outer polymer layer is amended with an adhesive functional group to enhance bonding to said insulating polymer layer.

18. An electrically driven assembly for use at an oilfield and having a motor comprising:
a hermetically sealed casing containing an oil-filled space;
a motor winding spool within the oil-filled space of said casing; and
a motor winding wire of said motor winding spool, said motor winding wire having a conductive core surrounded by an electrically insulating polymer layer, the insulating polymer layer surrounded by a contaminant resistant outer polymer layer.

19. The electrically driven assembly of claim 18 wherein the outer polymer layer is one of a fluoropolymer and a polyolefin and the insulating polymer layer is of a material selected from a group consisting of a polyimide, polyester, polyesterimide, polyamide-imide, polyamide, poly-ether-ether-ketone, polyethylene terephthalate, polyphenylene sulfide, a self-reinforced polyphenylene, polymeric imide, polymeric ester, polymeric ester-imide, polymeric ester-amide, polymeric amide-imide, polymeric urethane, and an epoxy.

20. The electrically driven assembly of claim 19 further comprising a tie layer disposed between said insulating polymer layer and said outer polymer layer for bonding therebetween, said tie layer further comprising:
a base polymer selected from a group consisting of a polyimide, polyester, polyesterimide, polyamide-imide, polyamide, poly-ether-ether-ketone, polyethylene terephthalate, polyphenylene sulfide, a self-reinforced polyphenylene, polymeric imide, polymeric ester, polymeric ester-imide, polymeric ester-amide, polymeric amide-imide, polymeric urethane, an epoxy, an ethylene-tetrafluoroethylene copolymer, polychlorotrifluoroethylene, ethylene chlorotrifluoroethlyene, perfluoroalkoxy resin, fluorinated ethylene propylene copolymer, polytetrafluoroethylene, polyethylene, polypropylene, ethylene-propylene copolymer, poly(4-methyl-1-pentene), and a polyolefin elastomer; and
an adhesive functional group selected from a group consisting of maleic anhydride, acrylic acid, carboxyl acid, and silane.

21. The electrically driven assembly of claim 18, further comprising one of an electric submersible pump, a downhole tractor, a powered centralizer, a perforation gun, and a sampling tool, and wherein the motor is configured to operate the one of the electric submersible pump, the downhole tractor, the powered centralizer, the perforation gun, and the sampling tool.

22. A motor for use within a hydrocarbon wellbore, the motor comprising:
a casing;
at least one spool of motor winding wire disposed within the casing and comprising:
a single conductive core;
an electrically insulating polymer layer about said conductive core; and
a contaminant resistant outer polymer layer about said electrically insulating polymer layer, wherein the outer polymer layer is of a material selected from a group consisting of an ethylene-tetrafluoroethylene copolymer, polychlorotrifluoroethylene, ethylene chlorotrifluoroethlyene, perfluoroalkoxy resin, fluorinated ethylene propylene copolymer, polytetrafluoroethylene, expanded-polytetrafluoroethylene (ePTFE), any improved fluoropolymers, polyethylene, polypropylene, ethylene-propylene copolymer, poly(4-methyl-1-pentene), and a polyolefin elastomer.

23. The motor of claim 22, wherein the motor is powered by an electrical cable external of the casing and separate from the at least one spool of motor winding wire.

24. The motor of claim 22, wherein the casing is hermetically sealed and has an oil-filled space, and wherein the at least one spool of motor winding is disposed in the oil-filled space.

25. A motor for use within a hydrocarbon wellbore, the motor comprising:
   a casing;
   at least one spool of motor winding wire disposed within the casing and comprising:
      a single conductive core;
      an electrically insulating polymer layer about said conductive core;
      a contaminant resistant outer polymer layer about said electrically insulating polymer layer; and
      a tie layer disposed between said insulating polymer layer and said outer polymer layer to provide bonding therebetween,
   wherein the outer polymer layer is of a material selected from a group consisting of an ethylene-tetrafluoroethylene copolymer, polychlorotrifluoroethylene, ethylene chlorotrifluoroethlyene, perfluoroalkoxy resin, fluorinated ethylene propylene copolymer, polytetrafluoroethylene, expanded-polytetrafluoroethylene (ePTFE), any improved fluoropolymers, polyethylene, polypropylene, ethylene-propylene copolymer, poly(4-methyl-1-pentene), and a polyolefin elastomer.

26. The motor of claim 25, wherein said outer polymer layer is of a material selected from a group consisting of an ethylene-tetrafluoroethylene copolymer, polychlorotrifluoroethylene, ethylene chlorotrifluoroethlyene, perfluoroalkoxy resin, fluorinated ethylene propylene copolymer, polytetrafluoroethylene, expanded-polytetrafluoroethylene (ePTFE), any improved fluoropolymers, polyethylene, polypropylene, ethylene-propylene copolymer, poly(4-methyl-1-pentene), and a polyolefin elastomer, and
   wherein said outer polymer layer is amended with an adhesive functional group to enhance bonding to said insulating polymer layer.

27. The motor of claim 25, wherein the motor is powered by an electrical cable external of the casing and separate from the at least one spool of motor winding wire.

* * * * *